Jan. 17, 1950  L. M. HENNING  2,494,809
POULTRY WATERING DEVICE
Filed Nov. 2, 1948

INVENTOR.
Larry M. Henning
BY Victor J. Evans & Co.
ATTORNEYS

Patented Jan. 17, 1950

2,494,809

UNITED STATES PATENT OFFICE 2,494,809

POULTRY WATERING DEVICE

Larry M. Henning, Riverside, Calif.

Application November 2, 1948, Serial No. 57,916

2 Claims. (Cl. 119—72)

This invention relates to a poultry watering device.

The object of the invention is to provide a poultry watering device which will prevent the poultry from dripping excess water onto the floor.

Another object of the invention is to provide a pan for a poultry watering device which will collect surplus water carried by the poultry and shunt the surplus water back into the watering device to thereby maintain the area surrounding the watering device in a sanitary condition.

A further object of the invention is to provide a poultry watering device which is extremely simple and inexpensive to manufacture.

Other objects and advantages will be apparent during the course of the following description.

In the accompanying drawings forming a part of this application, and in which like numerals are employed to designate like parts throughout the same:

Figure 1:
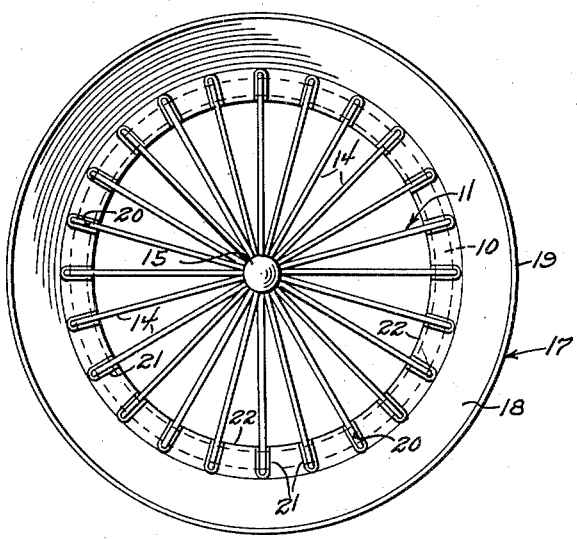
Figure 1 is a top plan view of the poultry watering device, according to the present invention.
Figure 2:
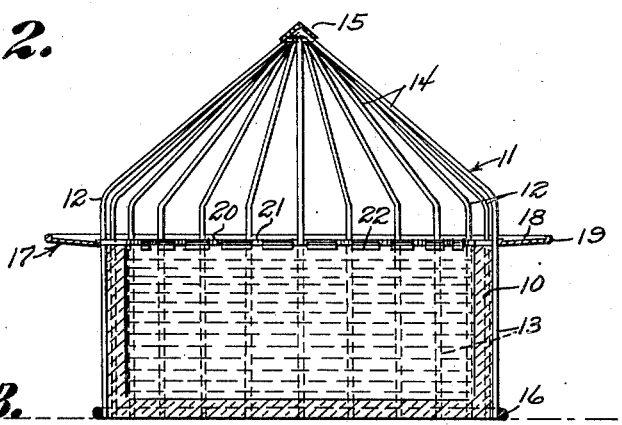
Figure 2 is a vertical sectional view of the poultry watering device.

Referring in detail to the drawings, the numeral 10 designates a cylindrical open-topped crock or basin adapted to contain water for watering poultry. Surrounding the basin 10 and projecting upwardly is a guard 11, Figures 1 and 2, for preventing the poultry from stepping into the basin 10, and the guard 11 embodies a plurality of spaced, parallel wire guard members 12. The guard members 12 include vertically-disposed lower portions 13 and upper portions 14 which converge to a common point and are preferably welded to a cap 15. The lower ends of the guard members 12 are secured to a wire ring 16, Figure 2, which surrounds the basin 10 and rests on the ground or a suitable box which supports the watering device.

Figure 3:
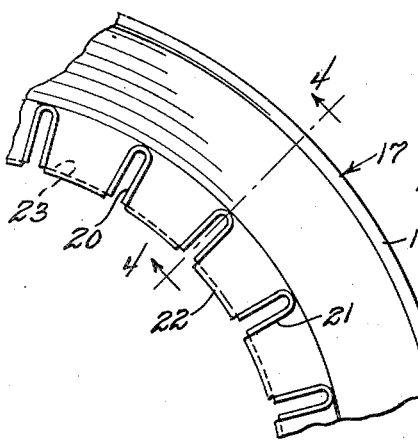
Figure 3 is an enlarged fragmentary top plan view of the pan for collecting and returning surplus water.
Figure 4:
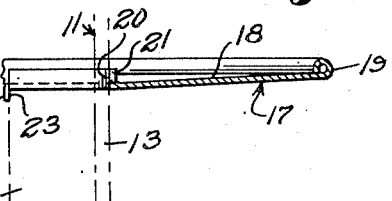
Figure 4 is an enlarged sectional view taken on the line 4—4 of Figure 3.

For preventing the poultry from dripping surplus water on the area surrounding the basin 10, a circular inclined or annular plate 17 is provided. The plate 17 is fabricated of suitable metal and surrounds the guard 11. The plate 17 comprises a flat body portion 18 which has an outer rolled edge or bead 19, the body portion 18 being inclined upwardly so that water collected thereon will run back toward the basin 10. The body portion is provided with a plurality of radially-disposed, spaced slots or cutouts 20 for snugly receiving the lower vertical portions 13 of the guard members 12. The edge of the plate 17 surrounding each of the slots 20 is bent upwardly, as at 21 providing a small flange, so that water will be guided by the upwardly-bent edges back into the basin 10. The inner edges 22 of the plate 17 are bent downwardly along the crease line 23 providing a flange, Figure 3, so that when the plate 17 is attached to the guard 11 and basin 10, the downwardly extended flange 22 on the inner edge will fit over the upper inner edge of the basin 10, so that the poultry will not rake their wattles over the projecting edge of the plate, and also bending the edges 22 downwardly will reduce the distance that the poultry will have to reach for water.

In use, the guard 11 is positioned around the basin 10 containing water, and the plate 17 is arranged so that the vertical portions of the guard member 12 are received in the slots 20 and the plate has its inner, downwardly-bent edges 22 extending over the upper inner edge of the basin 10. Normally, when a hen drinks water, she dips her bill in the water in the basin 10 and her wattles are also immersed in the water. Then, when she brings her head back up to swallow the water, the surplus water on her wattles runs down her lower bill and wattles and drips just outside of the basin 10. This surplus water drips onto the floor or into a wire-covered conventional box (not shown) for supporting the watering device, and the surplus water becomes mixed with the manure and litter carried by the hens' feet, forming a filthy mass which attracts vermin, flies, etc. Thus, there is imposed on the poultry keeper a very disagreeable and time-consuming task of keeping the area around the watering device clean. By providing the watering device with the plate 17, this cleaning job will be eliminated, since the surplus water never reaches the floor, but instead is caught or collected by the plate 17 and the water is returned to the basin 10.

As many embodiments may be made of this invention, and as many modifications may be made in the embodiment hereinbefore shown and described, it is to be understood that all matter herein is to be interpreted merely as illustrative and not in a limiting sense.

I claim:

1. In a watering container, the combination which comprises a basin having a base with a continuous upwardly extended side wall, a plurality of spaced wires positioned over the outer surface of the side wall of the basin and extended upwardly in converging relation to a point above the center of the basin providing a conical shaped guard, and an inwardly inclined annular plate positioned upon the upper edge of the side wall of the basin and extended outwardly from the peripheral surface of the basin for catching drip from fowl drinking from the basin and returning the drip to the basin, said annular plate having spaced radially disposed slots in the inner edge positioned to straddle the wires of the guard.

2. In a watering container, the combination which comprises a basin having a base with a continuous upwardly extended side wall, a plurality of spaced wires positioned over the outer surface of the side wall of the basin and extended upwardly in converging relation to a point above the center of the basin providing a conical shaped guard, and an inwardly inclined annular plate positioned upon the upper edge of the side wall of the basin and extended outwardly from the peripheral surface of the basin for catching drip from fowl drinking from the basin and returning the drip to the basin, said annular plate having spaced radially disposed slots in the inner edge positioned to straddle the wires of the guard and having upwardly extended flanges around the edges of the slots for guiding water from the plate around the wires to the basin and also having downwardly extended flanges on the inner edges of the sections of the plate between the slots to facilitate nesting of the inner edge of the plate on the upper edge of the wall of the basin.

LARRY M. HENNING.

REFERENCES CITED

The following references are of record in the file of this patent:

UNITED STATES PATENTS

| Number | Name | Date |
|---|---|---|
| 556,033 | Still | Mar. 10, 1896 |
| 1,808,433 | Poorman | June 2, 1931 |
| 1,816,781 | Johnston | July 28, 1931 |
| 1,906,016 | Stecher | Apr. 25, 1933 |
| 2,201,901 | Keen | May 21, 1940 |